O. P. DILLS.
Wheel-Plow.
No. 57,878.
Patented Sept. 11, 1866.
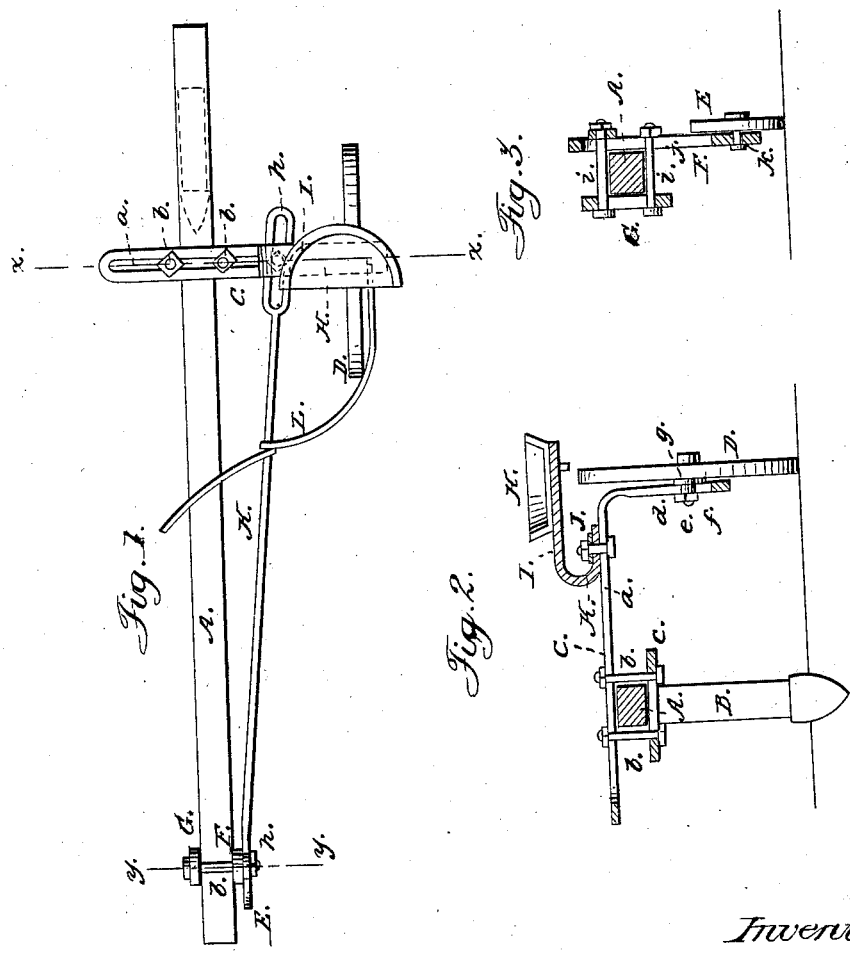
Witnesses:
Inventor:

UNITED STATES PATENT OFFICE.

O. P. DILS, OF FALMOUTH, KENTUCKY.

IMPROVEMENT IN WHEEL-PLOWS.

Specification forming part of Letters Patent No. 57,878, dated September 11, 1866.

*To all whom it may concern:*

Be it known that I, O. P. DILS, of Falmouth, in the county of Pendleton and State of Kentucky, have invented a new and Improved Plow Attachment; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a transverse vertical section of the same, taken in the line $x$ $x$, Fig. 1; and Fig. 3, a transverse vertical section of the same, taken in the line $y$ $y$, Fig. 1.

Similar letters of reference indicate corresponding parts.

This invention relates to a new and improved attachment for plows, whereby any ordinary plow may be converted into a riding or sulky plow.

The invention is an improvement on a device for the same purpose for which Letters Patent were granted to me September 5, 1865.

The present invention consists in having the arm to which the seat and supporting-wheel are attached adjustable, so that the supporting-wheel may be placed nearer to or farther from the plow-beam, as desired, and said wheel also adjusted higher or lower, as may be desired.

The invention also consists in a novel construction of the brace-rod for the arm, whereby said brace-rod may be applied to beams of different length. The gage-wheel also, at the front end of the beam, is differently arranged from the old plan, and is rendered capable of being adjusted higher or lower, according to the depth of the furrow required to be made by the plow.

A represents a plow-beam, and B the standard attached to its rear end, and to which standard the plow is secured.

C represents a metal bar, which has a slot, $a$, made in it and extending nearly its whole length. This bar C is secured to the beam A at right angles by means of a clamp composed of two screw-bolts, $b$ $b$, passing through the slot $a$ and through a plate, $c$, at the under side of the beam, as shown in Fig. 2.

The outer part of the bar C is bent or curved down to a vertical position, as shown at $d$ in Fig. 2, and the axle $e$ of a wheel, D, passes through said slot, and is secured therein by a nut, $f$, a screw-thread being cut on the axle for the nut to work in, and the latter being provided with a washer, $g$, so that by screwing up the nut $f$ the axle will be secured at any desired point. By this means the bar C may be adjusted higher or lower, as occasion may require.

The front part of the beam A is supported by a wheel, E, the axis $h$ of which passes through a vertical bar, F, which is secured to the beam by a clamp composed of two screw-bolts, $i$ $i$, passing through a plate, G, and through a vertical oblong slot, $j$, in the bar F. (See Fig. 3.) By this means it will be seen that the bar F and wheel E may readily be adjusted higher or lower, according to the depth of furrow required, and the wheel D adjusted to correspond with wheel E; and it will further be seen that the bar C may be adjusted in a longitudinal direction, so as to bring the wheel D nearer to or farther from the beam A, as occasion may require.

H represents the driver's seat, which is attached to a curved bar, I, secured to the bar C by a bolt, J, the latter passing through the slot $a$, as shown clearly in Fig. 2. This arrangement admits of the bar I being adjusted on the bar C as occasion may require.

K represents a brace-rod, the front end of which is secured to the front part of the beam A by one of the bolts $i$. The rear end of this rod is formed with a longitudinal loop or eye, $k$, which is secured to the bar C by the same screw-bolt J which secures the bar I to the bar C. This longitudinal loop or eye $k$ admits of the brace-rod K being applied to plow-beams of different lengths and to any kind of plow. The brace-rod K holds the bar C steadily and firmly, and the rod K may be prevented from shifting laterally by a brace-rod, L, one end of which is attached to the under side of the seat H, said rod being wound around the brace-rod K. The advantage of this arrangement consists in the adjustability of the wheels D E, bar C, and the loop or eye *k* of the brace-rod K, which renders the attachment capable of being applied to any of the ordinary kinds of plows in general use.

Having thus described my invention, I claim as new and desire to secure by Letters Patent—

The slotted adjustable bars C F, with wheels D E attached, and the brace-rod K, provided with the loop or eye *k*, all arranged and applied to a plow, substantially in the manner as and for the purpose set forth.

O. P. DILS.

Witnesses:
H. CLAY DILTS,
JOHN L. CHILES.